2,933,408
METHOD FOR WET MILLING RUTILE PIGMENT

Augustine N. Dempster, Fords, and Walter K. Nelson, Metuchen, N.J., assignors to National Lead Company, New York, N.Y., a corporation of New Jersey No Drawing. Application May 28, 1957
Serial No. 662,016

2 Claims. (Cl. 106—300)

The present invention relates in general to the production of titanium dioxide pigment and more particularly to an improved method for producing an aqueous-media-dispersible titanium dioxide pigment of the rutile modification.

In producing some grades of calcined titanium dioxide pigment the pigment is subjected to a wet-milling treatment which comprises pulverizing the calciner cooling-barrel discharge in a micronizer, micropulverizer, jet mill or the like, repulping in pulverized discharge with water and a dispersing agent to form a slurry, wet grinding the pigment slurry in a ball or pebble mill and then classifying the milled slurry, preferably by centrifuging, to yield a product of uniform particle size.

To effectively ball mill the pigment slurry it must be dispersible in aqueous media, as for example, water. However, in the normal process for producing titanium dioxide pigment from a hydrate precipitated from a sulfate solution, the precalcined hydrate is treated with various metal reagents to impart certain desired properties to the pigments upon calcination. Upon calcination these metal reagents are converted to salts and in particular metal sulfates which are soluble in water and if present in large amounts on the calcined pigment will cause the pigment to flocculate, even in the presence of a dispersing agent, thereby inhibiting good water dispersion of the pigment which is necessary for effective wet grinding.

In calcining $TiO_2$ pigment of the anatase modification the temperatures used are generally sufficiently high, as for example, from 95°–1000° C., to decompose the metal sulfates and volatilize substantially all of the sulfur as sulfuric oxides and hence the dispersion of a high temperature calcined anatase pigment in water, in the presence of a dispersing agent, is no problem.

However, in the production of pigmentary grade $TiO_2$ of the rutile modification calcination temperatures, in general, must be relatively low to preclude excessive crystal growth. Maximum permissible temperatures are no higher than 950° C. and at these temperatures only a relatively small amount of the occluded metal sulfates are decomposed and volatilized as sulfuric oxides from the pigment. As a consequence rutile pigments flocculate in water and hence cannot be effectively dispersed in water even when treated with excessively large amounts of dispersing agents. Poor water dispersion not only seriously inhibits good grinding of the pigment but the pigment slurries tend to be so viscous and sticky that slurries of only relatively low solids content can be successfully milled.

It is highly desirable, therefore, to provide improved means for treating a titanum dioxide pigment of the rutile modification so that this type of pigment will disperse readily in an aqueous media, such as water, with the use of economical amounts of dispersing agents, and form water slurries of high dispersion rating and low viscosity.

An object, therefore, of the present invention is to provide an improved aqueous-media-dispersible titanium dioxide pigment of the rutile modification. Another object of the invention is to provide an improved method for treating a titanium dioxide pigment of the rutile modification to render it readily dispersible in water. A still further object of the invention is to leach a titanium dioxide pigment of the rutile modification such that the leached pigment will disperse readily in water in the presence of a dispersing agent to form a slurry having a high dispersion rating.

These and other objects, features and advantages of the invention are described in greater detail in the description of the invention which follows.

Broadly, the instant invention relates to an aqueous-media-dispersible, calcined titanium dioxide pigment of the rutile modification; and to a process for wet milling a titanium dioxide pigment of the rutile modification wherein the pigment, prior to introduction into the mill, is leached with water to reduce the occluded water-soluble, metal salts to an amount less than 0.25% calculated as sulfuric oxides ($SO_4$) on a $TiO_2$ weight basis, and then slurrying the leached pigment in water in the presence of from 0.1 to 0.6% dispersing agent to produce a rutile pigment slurry having a throughput rating in the range of from 93% to 98%.

Throughput ratings are based on a solids-settling test wherein the slurry from the ball mill is poured into a beaker, diluted with water to a solids content of 12.5%, and allowed to settle for a predetermined length of time which is determined, in accordance with Stokes' law, by the height of the slurry in the beaker. At the end of this time any particles larger than 3½ microns in size will have settled out. Thus a throughput rating, for example, of 95%, indicates that 5% of the pigment slurry settled out in a predetermined length of time, the remaining 95% being dispersed in the liquor.

The present invention is based on the discovery that by subjecting a rutile titanium dioxide pigment to a post-calcination leaching treatment such that the occluded water-soluble metal salts are reduced to less than 0.25%, calculated as sulfuric oxides on a $TiO_2$ weight basis, the leached rutile pigment will not only disperse readily in water, in the presence of a dispersing agent, but only economical amounts of dispersing agents are required, i.e., amounts within the range of from 0.1 to 0.6% on a $TiO_2$ weight basis and preferably about 0.2%.

Titanium dioxide pigments are usually produced by calcining hydrous titanium oxide obtained by hydrolysis of a titanium sulfate solution. As mentioned above most pigmentary grades of titanium dioxide are prepared by subjecting the hydrous titanium oxide to a precalcination treatment or treatments to improve the pigmentary qualities of the calcined pigment. To these ends treating agents such as potassium or sodium sulfates or hydroxides, aluminum sulfate, compounds of phosphorus, antimony oxide, zinc or tin oxide, and mixtures thereof, are added to a water slurry of the washed titanum hydrate after which the slurry is deliquored preparatory to being introduced into the calciner.

The potassium and/or sodium sulfates and the phosphorous compounds are added to prevent sintering during calcination and to insure soft pigment while the aluminum sulfate insures good color. The oxides of zinc and tin are added to facilitate conversion of the crystals to the rutile modification. In this connection, it is customary, in producing rutile pigment, to also add a rutile seed to the hydrate prior to calcination so that conversion to the rutile modification will be effected at relatively low temperatures thereby prohibiting crystal growth to a size that would impair pigment quality. After calcination a rutile pigment will normally contain at least 0.3% and as high as 1.0% occluded water-soluble metal sulfates.

It has been discovered that to effectively disperse a rutile pigment in water, using economical amounts of dispersing agents, the amount of metal sulfates occluded in the pigment cannot be more than and is preferably less than 0.25% calculated as sulfuric oxides by weight of the pigment; and that if a calciner discharge of rutile pigment is water leached, as for example, by washing with water, ball milling in water, and the like, for a predetermined length of time, the occluded metal salts can be reduced to no more than 0.25% as ($SO_4$) on a $TiO_2$ weight basis thereby rendering the rutile pigment readily dispersible in water in the presence of a dispersing agent in amounts within the range of from 0.1 to 0.6% and preferably 0.2%.

The pigment, usually as calciner discharge, may be leached by any suitable technique, as for example, by simply stirring the pigment into water, prior to or after pulverizing the pigment, and washing the slurry by decantation, or by filtering the water slurry and washing the filter cake, or again, by ball milling the water slurry for a predetermined length of time and then washing the milled slurry either by decantation or by filtering and then washing the filter cake with several successive portions of water.

Following the water-leaching treatment the leached rutile pigment is again slurried with water to which slurry is added from 0.1 to 0.6% of a dispersing agent and again ball milled for a predetermined length of time. To determine the throughput rating of the ball-milled slurry, it is then hydroclassified, preferably by centrifuging, although the solids-settling test hereinabove described may be used. Throughput ratings of a rutile pigment water leached in accordance with the method of this invention have been obtained as high as 98%.

Heretofore, the permissible solids content of ball mill feed slurries has been from 30 to 35% for non water-leached rutile pigments provided, however, from at least 1.0% to 3.0% on a $TiO_2$ weight basis of a dispersing agent are used. However, by water leaching a calcined rutile pigment prior to milling, it is now possible to prepare ball mill feed slurries of as high as 50% solids and in some instances as high as 70% solids using as little as 0.2% dispersing agents on a $TiO_2$ weight basis. Thus relatively high rates of pigment throughput in the mill are possible with accompanying economies of operation.

While the invention makes its most significant contribution of the art in the leaching and milling of rutile $TiO_2$ pigment, it is within the purview of the invention to water-leach any calciner discharge $TiO_2$ pigment having more than 0.25% occluded metal sulfates calculated as sulfuric oxides.

The invention will be more fully described by the following specific examples which are given primarily for purposes of illustration and are not to be construed as limiting the invention in its broader aspects.

The calcined titanium dioxide used for illustrating the advantages and utility of the instant invention was prepared by the well-known sulfate process and comprised four grades of pigment of the rutile modification.

Grade I pigment was prepared by treating the uncalcined hydrate with potassium sulfate and aluminum sulfate, the first being added to prevent sintering during calcination and to produce soft pigment, the second to produce good color; grade II pigment was prepared by treating the uncalcined hydrate with sodium sulfate in addition to the potassium and aluminum additions; grade III pigment was prepared by adding lesser amounts of both potassium hydroxide and aluminum sulfate to the hydrate and in addition a small amount of phosphoric acid and zinc oxide to facilitate conversion to rutile; and grade IV pigment was similar to grade III but with the addition of sodium sulfate.

Each of the above hydrates was calcined to form a rutile pigment. Grades I and II were calcined at 950° C. and grade III and IV at 850° C. All grades comprised from 95% to 100% rutile.

Each of these four grades of pigment was divided into two 200 gram samples; one of which was water leached prior to ball milling and the other of which was ball milled without being water leached.

In each instance in which a sample pigment was water leached, 200 grams of the pigment was slurried with water to a solids content of 25% and milled in a one-quart ball mill for 2½ hours. The slurry was then filtered and washed three consecutive times with 500 milliliters of demineralized water.

The percent sulfate values calculated as $SO_4$ on a $TiO_2$ weight basis in the four grades of calcined pigment prior to leaching and the percent sulfate values remaining in the calcined pigments after water leaching are shown in Table I below:

Table I $TiO_2$ PIGMENT OF RUTILE MODIFICATION

| Grade | $K_2SO_4$ | $Al_2SO_4$ | $Na_2SO_4$ | $P_2O_5$ | ZnO | Percent $SO_4$ in calcined pigment | Percent $SO_4$ after leaching |
|---|---|---|---|---|---|---|---|
| I | X | X | | | | 0.41 | 0.06 |
| II | X | X | X | | | 0.40 | 0.09 |
| III | X | X | | X | X | 0.37 | 0.11 |
| IV | X | X | X | X | X | 0.31 | 0.12 |

Ball milling both the water-leached and unleached calcined pigment was carried out using, in each instance, a standard amount of dispersing agent such as sodium hydroxide, sodium silicate, sodium phosphates such as sodium hexametaphosphate, amino-methyl propanol, monoisopropanolamine and mixtures thereof. In the instant series of experiments 0.2% monoisopropanolamine was used but it will be understood that other dispersants may be used and the amounts varied depending upon the type of dispersant. For the above-named dispersants it has been found that the quantities required may vary over a range of from 0.1 to 0.6%.

To ball mill the samples, 200 gram samples of the pigment, both water leached and unleached, were slurried in water to form slurries of both 50% and 35% solids. These slurries were then milled in one-quart ball mills for 16 hours. Thereafter, each sample was then tested for percent throughput in accordance with the test hereinabove described. The results of these series of experiments are tabulated in terms of percent throughput in Table II below:

Table II

BALL-MILLING TREATMENT—THROUGHPUT

| Pigment Grade | Water Leach 50% Solids | Water Leach 35% Solids | Unleached 50% Solids | Unleached 35% Solids |
|---|---|---|---|---|
| I | Percent 97.2 | X | None | Percent 92.5 |
| II | 96.7 | X | None | 89.0 |
| III | 97.2 | X | None | None |
| IV | 96.7 | X | None | None |

Table II clearly shows that no one of the four grades of unleached, calcined, rutile pigments ball milled at 50% solids was dispersible in water using a normal amount of (0.2%) monoisopropanolamine as a dispersing agent. In contradistinction the same pigments following a water-leaching treatment dispersed readily in water as indicated by throughput ratings within the range of from 96.7% to 97.2%. Moreover, although pigments of Grades I and II were dispersible in water when ball milled at 35% solids as indicated by throughput ratings of 92.5% and 89.0%, respectively, pigment grades III and IV were not dispersible at all at 35% solids. The data for column 3 of the table was not recorded inasmuch as a pigment having a high throughput at 50% solids will obviously have as high or higher throughput at 35% solids so that the values for column 3 of the table will necessarily be even greater than those shown in column 2.

Following the tests for throughput the series of samples were further processed to finished pigment by diluting the samples for hydroclassification at 12½% solids in a 2 liter beaker to remove particles larger than 3½ microns. The hydroclassified pigment was thereafter flocculated using 0.5% magnesium sulfate, filtered, washed with two volumes of water, dried and micropulverized. The micropulverized pigment was then evaluated by standard paint dispersion and fineness of grind tests. All samples had good dispersion ratings and fineness of grind and the differences between the respective samples were insignificant.

The invention may be carried out in other specific ways than those herein set forth without departing from the spirit and essential characteristics of the invention and hence the examples set out herein are, therefore, to be considered in all respects as illustrative and not restrictive of the invention and all changes coming within the meaning and equivalency range of the appended claims are intended to be embraced therein.

We claim:

1. In a process for making $TiO_2$ pigment from a $TiO_2$ calciner discharge containing occluded water soluble metal sulfates in an amount from 0.3% to 1.0% calculated as sulfuric oxides on a $TiO_2$ weight basis wherein the calcined $TiO_2$ calciner discharge is wet milled, the improvement comprising the steps of: washing the $TiO_2$ calciner discharge with water prior to wet milling sufficiently to reduce the occluded water soluble metal sulfates in said $TiO_2$ calciner discharge to an amount no more than 0.25% calculated as sulfuric oxides on a $TiO_2$ weight basis, and then wet milling the washed $TiO_2$ calciner discharge in the presence of a dispersing agent selected from the group consisting of sodium hydroxide, sodium silicate, sodium phosphate, aminomethyl propanol, monoisopropanolamine and mixtures thereof.

2. In a process for making $TiO_2$ pigment from a $TiO_2$ calciner discharge containing occluded water soluble metal sulfates in an amount greater than 0.3% calculated as sulfuric oxides on a $TiO_2$ weight basis wherein the $TiO_2$ calciner discharge is wet milled and hydroseparated, the improvement comprising the steps of: washing the $TiO_2$ calciner discharge with water prior to wet milling sufficiently to reduce the occluded water soluble sulfates in said calciner discharge to an amount no more than 0.25% as sulfuric oxides on a $TiO_2$ weight basis, adding the washed calciner discharge to water to form a slurry, adding from 0.1 to 0.6% dispersing agent selected from the group consisting of sodium hydroxide, sodium silicate, sodium phosphate, aminomethyl propanol, monoisopropanolamine and mixtures thereof to said slurry to form a wet mill feed, and milling said wet mill feed.

References Cited in the file of this patent

UNITED STATES PATENTS

| | | |
|---|---|---|
| 1,885,921 | Kubin | Nov. 1, 1932 |
| 2,065,762 | Stanley | Dec. 29, 1936 |
| 2,214,815 | Hanahan | Sept. 17, 1940 |
| 2,266,793 | Oppermann | Dec. 23, 1941 |
| 2,464,192 | Whately | Mar. 8, 1949 |
| 2,744,029 | Kingsbury | May 1, 1956 |

FOREIGN PATENTS

| | | |
|---|---|---|
| 628,491 | Great Britain | Aug. 30, 1949 |
| 742,500 | Great Britain | Dec. 30, 1955 |